United States Patent [19]
Robert

[11] Patent Number: 5,971,493
[45] Date of Patent: Oct. 26, 1999

[54] AUTOMATIC DUMP TRAILER LEVELER

[76] Inventor: Raymond D. Robert, P.O. Box 119, Dalton, Mass. 01227

[21] Appl. No.: 09/057,977

[22] Filed: Apr. 10, 1998

[51] Int. Cl.⁶ ....................................................... B60P 1/16
[52] U.S. Cl. ........................................ 298/17 S; 280/6.154
[58] Field of Search ................................. 298/17 S, 17.5, 298/22 C; 280/6.154; 180/41

[56] References Cited

U.S. PATENT DOCUMENTS

| | | |
|---|---|---|
| 3,044,832 | 7/1962 | McManus . |
| 3,203,735 | 8/1965 | Vestin . |
| 3,464,755 | 9/1969 | Brown . |
| 3,640,578 | 2/1972 | Finney ................................... 298/17 S |
| 3,921,128 | 11/1975 | Snead . |
| 4,036,528 | 7/1977 | Langendorf ............................ 298/17 S |
| 4,129,310 | 12/1978 | Nordmark ............................ 280/6.154 |
| 4,145,682 | 3/1979 | Cook . |
| 4,216,996 | 8/1980 | Pitts ....................................... 298/17 S |
| 4,261,616 | 4/1981 | Beegle ................................... 298/17 S |
| 4,375,903 | 3/1983 | Lovell ................................... 298/17 S |
| 4,382,632 | 5/1983 | Pitts ....................................... 298/17 S |
| 4,573,742 | 3/1986 | Tegtmeier ................................. 298/11 |
| 4,705,295 | 11/1987 | Fought . |
| 4,952,908 | 8/1990 | Sanner . |
| 5,769,502 | 6/1998 | Bettini ................................... 298/17.5 |

FOREIGN PATENT DOCUMENTS

| | | |
|---|---|---|
| 3807018 | 9/1989 | Germany . |
| 1289734 | 2/1987 | U.S.S.R. . |
| 2202497 | 9/1988 | United Kingdom . |

*Primary Examiner*—Stephen T. Gordon
*Attorney, Agent, or Firm*—Richard C. Litman

[57] ABSTRACT

An automatic dump trailer leveler provides for the lateral leveling of the dump box of a semi trailer dump body vehicle during dumping operations. The present leveling system may also be adapted for other vehicles having tilting bodies or body components, for precluding their lateral tipping when dumping operations are undertaken on laterally sloping terrain. The present system includes low and high pressure hydraulic pumps, with the low pressure pump providing hydraulic fluid for taking up slack in the leveling struts or jacks and the high pressure pump providing pressure for leveling the dump box of the trailer or dump vehicle. The present system is operable simultaneously with operation of the dump box lift strut, and may include delay switches for precluding secondary extension of struts immediately after they have extended to adjust for settling to one side. Rather, the present system responds to such secondary adjustment by releasing pressure on the opposite side, thus providing a greater range of travel than would otherwise be the case. Dump box lift strut cutout and/or lowering may also be provided, in the event the tilt of the dump box reaches or exceeds the limits of the system. An audible or visual alarm may also be provided in the operator cab of the vehicle to alert the operator when such a condition occurs.

20 Claims, 4 Drawing Sheets

AUTOMATIC DUMP TRAILER LEVELER

BACKGROUND OF THE INVENTION

1. Field of the Invention

The present invention relates generally to systems and apparatus for leveling a motor vehicle or trailer on sloping terrain, and more specifically to a system and apparatus for automatically laterally leveling the bed of a semi dump trailer when dumping operations are underway. The apparatus automatically compensates for the lateral tilt of the trailer frame when dumping is taking place on sloping terrain, and automatically discontinues dumping operations if a predetermined lateral slope is exceeded. Warning means may be included if a predetermined lateral slope is exceeded.

2. Description of the Related Art

Trucks having rearwardly tilting boxes or beds have been in use for some time, for use in carrying and dumping large quantities of materials (gravel, sand, dirt, etc.) in construction work and the like, hauling agricultural material, trash and refuse, scrap metal, etc. Most such trucks comprise an integrated vehicle having a single, unitary frame for the cab and dump body, with no separate trailer. Such vehicles generally have a relatively short dump box, with the box not extending to any great height when raised for dumping.

However, the development of larger dump vehicles comprising a relatively long semi trailer towed behind a semi truck, has permitted dump body trailers to be developed which have considerably more capacity and which are considerably longer than the more common unitary dump truck. When the forward end of the dump box of such a trailer is raised in order to tilt the box rearwardly for dumping the contents thereof, the forward end of the elongate dump box is raised to a considerable height, perhaps thirty feet or more above the surrounding terrain. While the dump box would not normally be raised to its maximum slope immediately with a full load therein, the dump box will still have a fair quantity of material therein when it is raised to its maximum extent, and in any event, the structure of the dump box itself is relatively heavy in order to provide the required structural strength for the vehicle.

It will be seen that the center of gravity of the partially laden dump box is elevated considerably above the underlying surface of the vehicle, and that any lateral slope upon which the semi truck is parked during dumping, will cause the center of gravity of the dump box (and thus of the entire vehicle of which the dump box is a part) to be laterally shifted toward the downhill side of the slope. If the dump box is raised sufficiently high and has a sufficiently heavy load therein, and the slope is sufficiently steep, this can easily lead to the entire semi truck and trailer tipping over, even though the slope may have been easily negotiable with the trailer in its lowered position.

It should be noted that the types of operations and materials for which such semi truck dump trailers are frequently used, often result in the dumping of materials in relatively unstable areas (soft farm fields, road and building construction sites, and particularly, sanitary landfills). Even when the slope initially appears sufficiently shallow to allow the dump box to be raised to its maximum extent, the rearward shift of the center of gravity of the trailer as the dump box is tilted upwardly and rearwardly, will place additional weight on the rear wheels of the vehicle. This can often result in further settling of the ground beneath the rear wheels of the trailer, particularly on the low side of the trailer as the center of gravity shifts laterally when the box is raised.

Accordingly, various mechanisms have been developed in the past for leveling at least the dump box of such a semi trailer dump vehicle, and/or for warning the operator of the vehicle if the slope is hazardous. The present inventor is aware of many such mechanisms providing for such leveling or warning, but in each case, the related art device fails to provide for all of the features required of such a mechanism, such as a slight time delay to allow for settling of the vehicle wheels as the dump box is initially tilted, automatic stopping of the operation if a predetermined slope is reached or exceeded, and other features providing optimum operational efficiency of such a system. A discussion of the related art of which the present inventor is aware, and its differences and distinctions from the present invention, is provided below.

U.S. Pat. No. 3,044,832 issued on Jul. 17, 1962 to Frank C. McManus, titled "Fluid Stabilizing Means For Semi-Trailer Tilting Bodies," describes hydraulic and manual means for leveling a tilting semi trailer body by applying bracing against the outboard tires of the trailer. No automated means of determining a level position for the trailer, is disclosed. The use of bracing against the treads of pneumatic tires produces less than optimum stability for the assembly, as the tires themselves would distort as the load placed upon them varies according to shifting of the load as it dumps, wind loads, etc. The present invention provides a fully automated means of leveling a semi dump trailer by applying hydraulic force between the dump box and the underlying frame, or between the frame and the axle(s).

U.S. Pat. No. 3,203,735 issued on Aug. 31, 1965 to Petrus A. Vestin, titled "Fluid Operated Tilting Dump Truck Stabilizer," describes a system for locking the rear suspension of the truck in the loaded or compressed position during dumping operations. The rear suspension of the truck remains compressed during the time the dump box is raised and the load is emptied therefrom, with the spring compression being released when the empty box is lowered to its rest position. However, the Vestin system does not operate like the present system, in that it does not provide for any differential adjustment of the dump box tilt. The Vestin system operates on both sides of the suspension equally, with no lateral differential provided. Also, Vestin does not disclose any means for adjusting the suspension while the box is elevated.

U.S. Pat. No. 3,464,755 issued on Sep. 2, 1969 to Edward Brown, titled "Dump Trailer Safety Device," describes a system for automatically lowering the dump box of a semi trailer dump rig. If a predetermined tilt angle is reached, the Brown system overrides the manual dump box control and automatically lowers the trailer dump box. However, Brown does not provide any lateral adjustment means in his system, as provided by the present invention. A truck using the Brown system would have to be repositioned by the driver, which would take up additional time during the dumping operation, and likely delay other trucks waiting to dump in the same area. The present system includes means for automatically leveling the trailer dump box, or at least positioning the dump box within predetermined lateral angular limits, unlike the Brown system.

U.S. Pat. No. 3,921,128 issued on Nov. 18, 1975 to Edwin DeS. Snead, titled "Truck Roll Warning System," describes a system using a pair of mercury switches as leveling switches and mounted to the tilting dump box of the truck. The switches are connected to a warning means to warn the vehicle operator if the truck exceeds a predetermined lateral slope with the dump box lowered. As the dump box is raised, the angle of the mercury switch tubes is lowered relative to the horizontal, resulting in a smaller lateral tilt angle being required to set off the alarm. The system also automatically retracts the dump box when it is activated and the box is raised. No means for automatically leveling the truck trailer is provided by Snead.

U.S. Pat. No. 4,036,528 issued on Jul. 19, 1977 to Heinrich Langendorf, titled "Truck With Tiltable Body," describes a system wherein the dump box and frame are pivoted on a longitudinal axis. One or more hydraulic struts are used to level the dump box relative to the underlying axle and structure. Langendorf notes that some automatic means of leveling the dump box would be preferable (column 2, lines 21–24), but does not disclose any means of accomplishing such automated leveling. Moreover, no means of detecting when the dump box is not level (mercury level switches, etc.) is disclosed by Langendorf.

U.S. Pat. No. 4,705,295 issued on Nov. 10, 1987 to Gerald E. Fought, titled "Material Handling Vehicle Stabilizer," describes a system adapted for use with vehicles having remotely operated booms, cranes, buckets, and the like. Such devices can upset the vehicle upon which they are mounted when they are displaced laterally from the vehicle, and some stabilizing means is desirable for such vehicles, just as in the case of the dump trailers to which the present invention is applied. However, the Fought system serves to lock hydraulically the hydraulic suspension members of the vehicle when the remote control system is activated. Such a system is not desirable for a dump trailer vehicle operating on potentially unstable terrain, where it is desirable to provide a continuous, automatic means of adjusting for the tilt of the vehicle. The present invention provides such automatic lateral adjustment for the rear axle of the dump trailer, as well as other advantages not provided by the Fought system.

U.S. Pat. No. 4,145,682 issued on Mar. 20, 1979 to John Cook, titled "Semi-Dump Truck Level Indicator," describes a device containing a pair of mercury operated level switches for activating a warning in the vehicle cab. The Cook system does not involve any pneumatic or hydraulic systems for actually leveling the vehicle, as provided by the present invention. Rather, the Cook system only provides a warning to the vehicle operator if the dump body is tilted laterally either left or right to a predetermined point. The same problem results with the Cook system as with the system of the Brown '755 U.S. Patent discussed further above, in that the vehicle operator would have to reposition the vehicle when the warning was activated, thus taking further time for the dumping operation.

U.S. Pat. No. 4,261,616 issued on Apr. 14, 1981 to William I. Beegle, titled "Apparatus For Preventing The Tipping Of Dump Vehicles," describes a mechanical system for operating a relief valve in the hydraulic strut for raising the dump body of the truck. If an excessive weight differential occurs between the two sides of the dump body, indicating excessive lean or tilt toward the heavier side due to suspension compression, the linkage causes a valve to turn, thereby releasing the hydraulic pressure in the lift strut. The same problems result here as in the Brown '755 and Cook '682 U.S. Patents, in that no means is provided for leveling the dump box relative to the rest of the vehicle, as provided by the present invention. Thus, a vehicle equipped with the Beegle system would have to be moved before dumping could be continued.

U.S. Pat. No. 4,375,903 issued on Mar. 8, 1983 to Patrick A. Lovell, titled "Vehicle Suspension System Augmenter," describes a system of hydraulic jacks located at the rear axle(s) of the vehicle or vehicle trailer. The system includes means for retracting the jacks so they remain clear of all opposite frame or suspension members when not in use, thus reducing wear and tear on the system. The present invention also utilizes means for retracting the hydraulic struts to remain clear of other components when not in use. However, the present invention includes means for automatically leveling the dump trailer during dumping operations, and for warning the vehicle operator and/or discontinuing the dumping operation if a predetermined tilt angle is reached. Lovell does not disclose any system for automatically actuating his hydraulic jacks, as provided by the present invention.

U.S. Pat. No. 4,573,742 issued on Mar. 4, 1986 to Sheldon D. Tegtmeier, titled "Hydraulic Stabilizing Mechanism For Use With Hydraulic Elevating System," describes a hydraulic system in which a plurality of hydraulic struts are simultaneously extendible or retractable to bear against the bolster or axle of a wagon. No level sensing means is disclosed by Tegtmeier. Rather, the system merely extends all of the jacks simultaneously to lock the wagon body rigidly relative to the underlying axle(s). If lateral tilting of the wagon body produces a greater lateral differential force in the wagon, the Tegtmeier system cannot compensate for such. The present invention provides means for automatically adjusting the level of a trailer during the dumping operation.

U.S. Pat. No. 4,952,908 issued on Aug. 28, 1990 to John A. Sanner, titled "Trailer Stability Monitor," describes a system for alerting the operator of a tractor truck in motion, i.e., traveling along a roadway. The Sanner system is adapted for detecting an incipient rollover of the trailer portion of the rig, and sending a signal to the cab to alert the driver. The system depends upon the driver to reduce speed and/or increase the turning radius, and/or to take some corrective action to reduce the lateral centrifugal forces acting on the trailer. While the Sanner system would provide a warning of excessive trailer tilt for dumping operations, it does nothing to level the trailer or to stop the operation of the trailer, as does the present invention. A vehicle operator would likely not have sufficient time to lower the lift box in the event of a warning by the Sanner device.

Soviet Patent Publication No. 1,289,734 published on Feb. 15, 1987 illustrates a hydraulically actuated stabilizing system wherein a pair of laterally opposed hydraulic struts are extended to make ground contact, before dumping operations may occur. The lateral cylinders must contact the ground and build up a predetermined amount of pressure before the dump box lift strut may be activated. No automatic leveling of the dump trailer is indicated, as provided by the present invention. The present inventor is aware of vehicles using such lateral struts, but such assemblies are excessively complex and require excessive time for deployment and retraction for dumping operations, and are not in general use with tractor trailers with dump trailer bodies.

British Patent Publication No. 2,202,497 published on Sep. 28, 1988 describes an electrohydraulic system for leveling the dump box of a semi trailer dump vehicle. The system includes electric and hydraulic circuitry which releases all hydraulic pressure from the leveling struts when the dump box is in its lowered position. Thus, the trailer cannot be leveled before dumping operations begin. Leveling is entirely dependent upon the vehicle operator, who must position the trailer in an area having no more than a two degree lateral slope, according to the limits disclosed in the British patent publication. If two degrees or more of lateral slope is encountered, the operator must move the vehicle and reposition it for another attempt. The present invention allows the simultaneous operation of the leveling struts with the dump box lift strut, thereby saving time during the dumping operation for greater efficiency, unlike the system of the British publication. Also, the present system may provide for alarm and/or dump box lift cutout means if a predetermined maximum tilt angle is reached.

Finally, German Patent Publication No. 3,807,018 published on Sep. 14, 1989 illustrates a pneumatically operated leveling system. The English abstract states that the system may be trimmed automatically or manually during dumping operations, but no schematic or componentry is shown for such a system, and moreover, no warning or disabling means is apparent from the disclosure, which means may be included in the present system.

None of the above inventions and patents, either singly or in combination, is seen to describe the instant invention as claimed.

SUMMARY OF THE INVENTION

The present invention comprises a system for automatically leveling the dump box of a semi trailer type dump truck. While the present invention is particularly adapted for use with such semi trailer dump vehicles, it will be seen that it may be adapted for use with other types of vehicles having tilting bodies or body components. The present automatic dump trailer leveler includes low pressure and high pressure hydraulic pumps, which are preferably powered by the conventional pneumatic system of the vehicle for operating the air brakes of the vehicle. Other means (electrical, etc.) may be provided to power the hydraulic system of the present leveling system. Electrical power is provided by the electrical system of the vehicle.

The hydraulic pumps provide hydraulic fluid under pressure for operating the hydraulic leveling struts of the present system. The present invention is a two stage system, with an initial low pressure take up serving to compress the retraction springs of the normally retracted struts and to extend the struts to an initial setting in contact with the opposite structure (axle, etc.) of the trailer. Once this is accomplished, the system operates to level the dump box of the trailer (assuming further leveling is required) by means of the high pressure hydraulic pump and system. In the event that the trailer settles further to one side during the dumping operation, the present system acts to level the trailer (up to the limits of the system) simultaneously with dumping operations.

The above described system also includes delay means, as oftentimes one side of the trailer will settle slightly before the opposite side, on unstable terrain. Rather than actuating the leveling system to raise the low side of the dump box immediately, and then have the opposite side settle, delay switches are provided to delay the actuation of the opposite side leveling strut(s). However, the present system provides for the immediate release of hydraulic pressure from the high side under such conditions, in order to react promptly to any out of level condition. If this lowering of the previously raised side is sufficient to bring the trailer back within tolerances, then the signal to the delay switch is canceled, with no further hydraulic operation being required. The present system may include dump cutout means to stop operation of the dump box lift strut, or to lower the lift strut, if the leveling system is incapable of maintaining the lateral level of the dump box within predetermined tolerances. Warning means (e.g., audible, visual) may also be provided in the tractor cab, to alert the operator if the system cannot maintain the lateral level of the trailer within predetermined tolerances.

When the dumping operation has been completed, the power to the high and low pressure hydraulic pumps is terminated, with hydraulic fluid being returned to the system reservoir. Preferably, the level struts are provided with mechanical retraction springs, thereby obviating any requirement for hydraulic or other means of maintaining the struts in a retracted position when dumping operations are not underway.

Accordingly, it is a principal object of the invention to provide an improved automatic dump trailer leveler for use with semi trailers having rearwardly tilting dump boxes, but which may also be adapted for use with other vehicles having tilting body portions thereon or therewith.

It is a further object of the invention to provide an improved automatic dump trailer leveler which includes delay circuitry for delaying secondary extension of the strut(s) of one side of the vehicle, while immediately lowering the opposite side as required.

It is another object of the invention to provide an improved automatic dump trailer leveler which may utilize pneumatic pressure from the air brake system of the vehicle for powering the hydraulic leveling system.

An additional object of the invention is to provide an improved automatic dump trailer leveler which includes means for holding the hydraulic leveling struts clear of the opposite vehicle structure against which they bear during leveling operations when leveling operations are not underway, and means for accurately positioning the struts for properly engaging their respective bearing points during leveling operations.

Still another object of the invention is to provide an improved automatic dump trailer leveler which may include dump box lift strut cutout means for stopping and/or lowering the lift strut if a predetermined tilt angle occurs, and which may include audible or visual warning means to alert the vehicle operator of such an occurrence.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

The present invention comprises an automatic system for laterally leveling a dump vehicle parked for dumping operations on laterally sloping terrain. While the present system is primarily directed for use and in combination with truck tractor and semi trailer vehicles where the trailer includes a rearwardly tilting dump box, it will be seen that the present system may be adapted to other types of dump vehicles as well, such as dump trucks having unitary frames for the dump box and truck cab.

Figure 1:
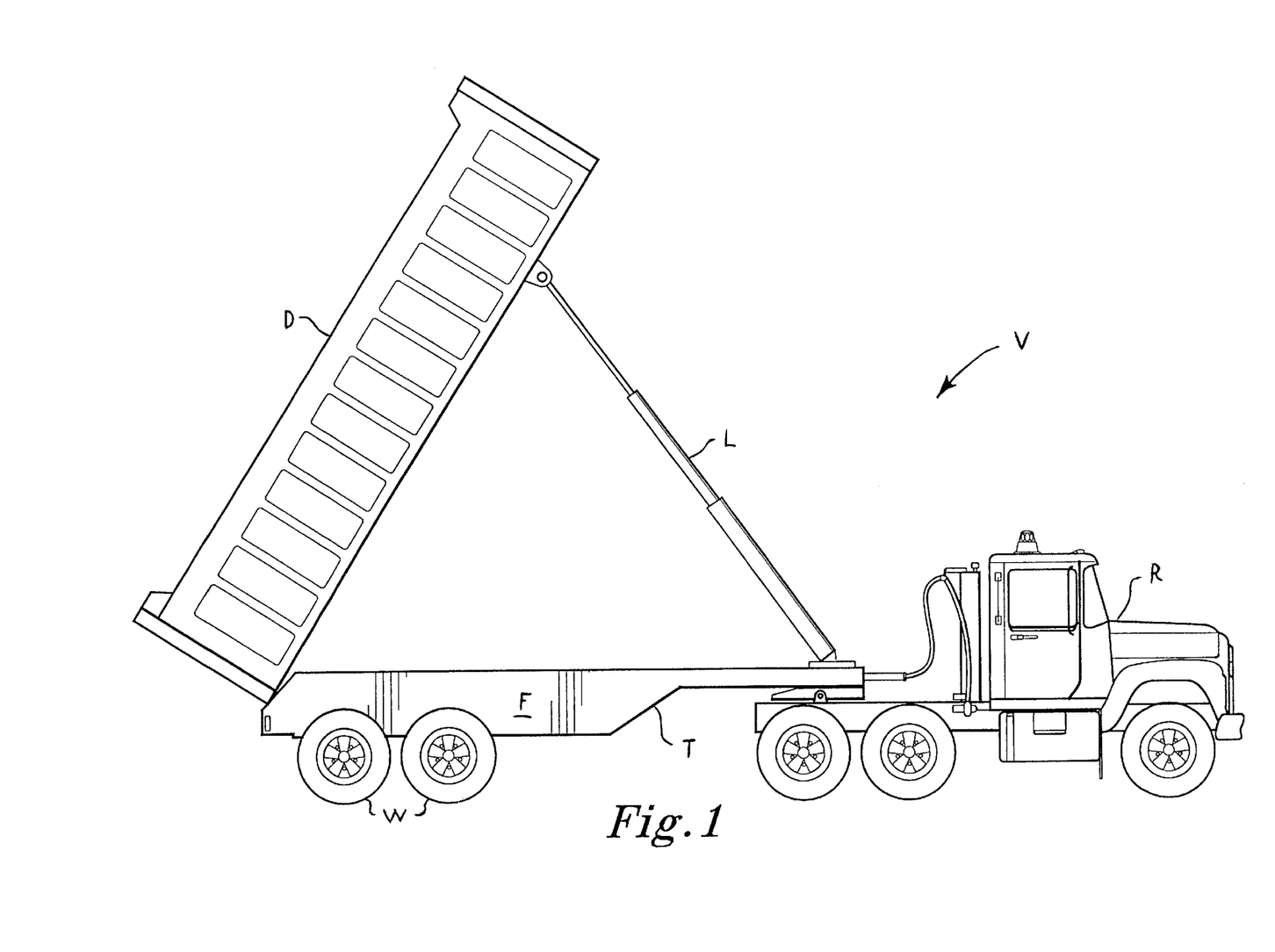
FIG. 1 is a right side elevation view of a semi trailer dump body and truck tractor with the dump box in a raised position, to illustrate the problems occurring with such vehicles.

FIG. 1 illustrates an exemplary truck tractor and semi trailer vehicle V, with the vehicle including a trailer T having a relatively long, rearwardly tilting dump box D thereon. The dump box D of such a vehicle V is conventionally raised by means of hydraulic power, which is used to extend a telescoping lifting strut L to raise the dump box D. Hydraulic pressure is conventionally provided by a hydraulic pump (not shown), which in turn may be powered by the primary engine of the vehicle V, an auxiliary engine, or by means of pneumatic pressure from the conventional air brake system (not shown) of such a vehicle V.

It will be seen in FIG. 1 that as the dump box D is tilted upwardly and rearwardly, the center of gravity of the box D (and its contents) will undergo a shift in the same direction. This has two effects: First, and most obviously, the higher center of gravity of the dump box D and its contents, lessen the lateral stability of the vehicle V. Second, the rearward shift of the center of gravity, shifts the weight rearwardly over the rear wheels.

Figure 2:
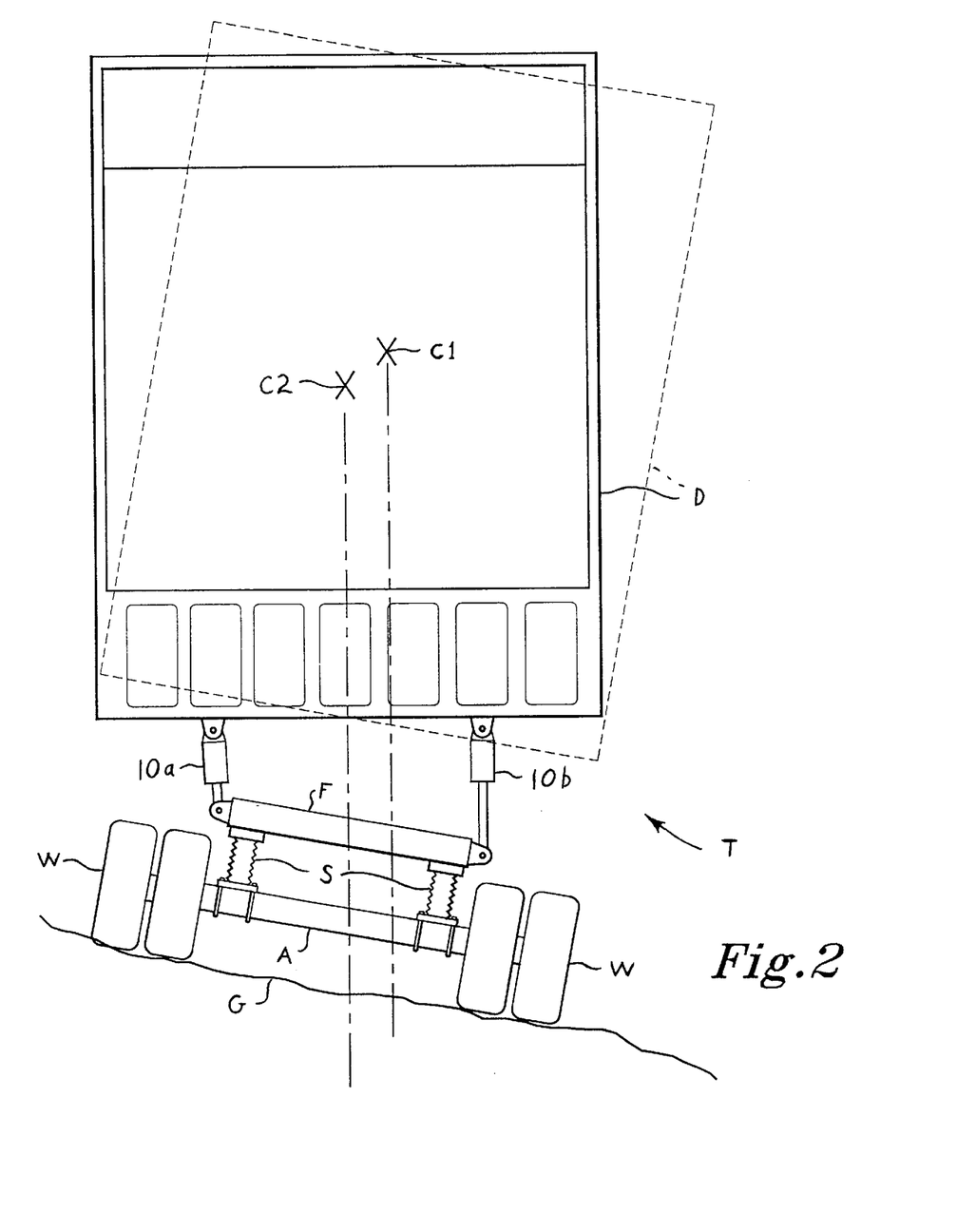
FIG. 2 is a rear elevation view of a raised dump box on a trailer frame parked on a laterally sloped surface, showing the shift of the center of gravity between a laterally tilted dump box and a level dump box.

FIG. 2 provides a rear elevation view in somewhat schematic form, of a clump vehicle V with the dump box D at least partially raised. (It will be understood that the forward or upper end of the dump box D of FIG. 2 would be considerably higher when raised to its fullest extent. The height is less than maximum, in order to conserve space in the drawing figure.) Some form of resilient suspension means S (leaf springs, pneumatic suspension, etc.) is provided between the trailer frame F and the underlying rear axle(s) A of the trailer T.

When the trailer T is parked on laterally sloping ground G for dumping operations, as shown in FIG. 2, the entire trailer T (including the dump box D) will tilt toward the lower side of the slope. If the dump box D remains laterally parallel to the frame F, it will also tilt to the lower side of the slope a corresponding amount, as shown in broken lines in FIG. 2. The center of gravity C1 is accordingly shifted toward the lower side of the slope, as shown in FIG. 2. It will be seen that if the slope of the ground G is steeper, and/or if the suspension S of the trailer T allows the dump box D to lean further toward the lower side of the slope than the actual angle of the slope, and/or if the dump box D (and its center of gravity) is raised higher, then the center of gravity C1 will be shifted even further toward the lower side of the slope G than is shown in FIG. 2, with the vertical projection therefrom perhaps even falling outside the rear wheels W, thus resulting in the trailer T (and likely the truck tractor R, shown in FIG. 1) falling over toward the low side of the slope.

The above described scenario does in fact occur from time to time with various types of dump vehicles, but is particularly potentially hazardous to truck tractor and semi trailer type dump vehicles V having relatively long dump boxes D, due to the much higher center of gravity when the dump box is raised. The greater weight carried by such relatively larger dump vehicles V also results in greater settling of the rear wheels W, particularly toward the lower side of the slope as the center of gravity C1 shifts in that direction when the dump box D is raised. This tilts the trailer T and dump box D even further toward the lower side of the slope.

Accordingly, various means of warning the vehicle operator and/or leveling the dump box D relative to the slope G, have been developed in the past. The object of such leveling devices is to reposition the dump box D so that its vertical axis is truly vertical, with the center of gravity C2 positioned essentially in line with the center of the rear axle(s) A, as shown by the dump box D in solid lines in FIG. 2. Prior art systems have used hydraulic devices disposed between the dump box D and underlying frame components F to level the dump box D, as shown in FIG. 2. The present invention accomplishes the goal of automatically leveling the dump box D using novel means, as described in detail further below. The present system may level the dump box D by means of first and second hydraulic struts 10a and 10b disposed between the dump box D and underlying frame F, as shown in FIG. 2, or by disposing the struts in some other location as desired.

Figure 3:
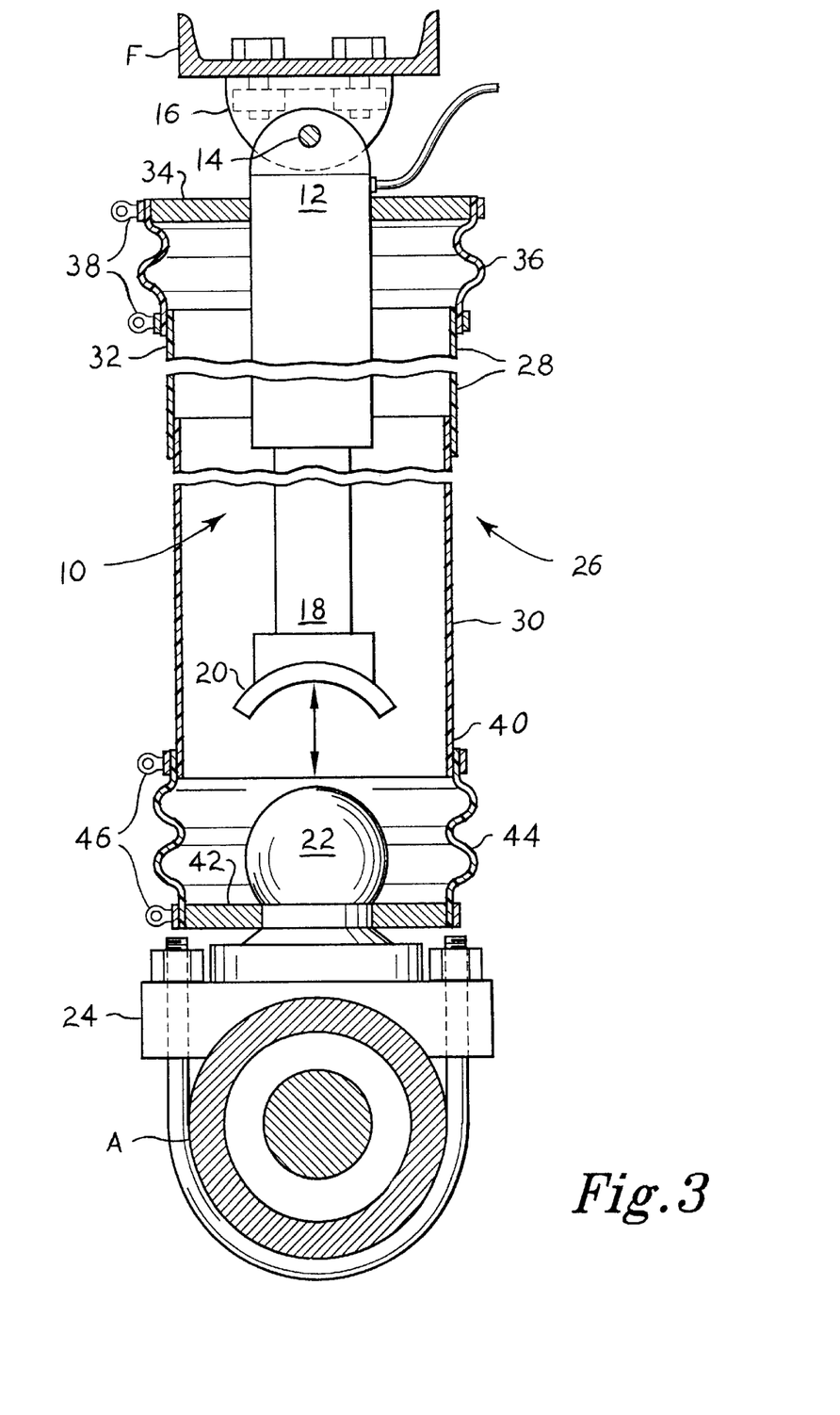
FIG. 3 is a fragmented side view in section of a hydraulic leveling strut or jack of the present invention, showing its attachment to the vehicle structure and selective engagement with opposing vehicle structure as well as means for maintaining registry of the jack with the opposing vehicle structure.

FIG. 3 illustrates an elevation view in section of an exemplary hydraulic strut 10 of the present invention, and its attachment and alignment means with the trailer frame F and axle A. (This arrangement is preferred, as the struts 10 are positioned between the trailer frame F and the trailer axle A, thus bypassing the suspension system S of the trailer T and locking the relative positions of the dump box D frame and trailer axle A immovably for dumping operations.) The strut 10 shown will be understood to be one of a plurality of such struts which are installed to the left and right sides of the trailer T (or rearwardly in other dump vehicles) above each of the rear axles A. Where two rear axles A are provided, a total of four such struts 10 would be used, with two left or first struts 10a and two opposite right or second struts 10b. A vehicle having three rear axles would have a total of six struts, etc.

Each of the struts 10 is a single acting telescoping hydraulic unit, held in a normally retracted condition by internal mechanical means (e.g., coil spring). Such single acting devices are known in the art, as indicated on page 9, lines 13–14 of the '497 British Patent Publication discussed further above. Such single acting, spring return struts are preferred, as the electrical and hydraulic circuitry of the present system is greatly simplified by their use. However, double acting hydraulic struts requiring a second hydraulic line, may be incorporated in the present system if so desired, along with the necessary electrical and hydraulic circuitry for hydraulically retracting the struts.

Each strut 10 has a first or upper end 12 secured to the frame member F, preferably by some means allowing arcuate motion of the strut 10, e.g., a pivot 14 through a bracket 16 which is in turn immovably secured (bolts, welding, etc.) to the frame member F. Arcuate motion of the struts 10 is preferred, as some horizontal motion will occur between the vehicle V structure and the axle A due to compliance in the suspension S, particularly in the event of laterally sloping terrain and when additional weight is placed upon the rear axles A as the dump box D is raised. Accordingly, a nonrigid upper mount 12 is provided for each strut 10.

The opposite lower end 18 of the strut 10 is normally retracted to remain clear of the axle A of the vehicle, as shown in FIG. 3. This permits the suspension S of the vehicle V to operate normally, to accommodate transient loads when the vehicle is in motion. However, when the present leveling system is actuated, each strut 10 is extended to contact the axle A (or a strut lower end receiving component secured to the axle A). Accordingly, the lower end 16 of each strut 10 includes some form of contact means thereon, such as the concave cup 20 shown in FIG. 3. (It will be understood that the cup 20 comprises a semispherical shape to mate with the spherical connection therebelow, and is seen in general cross section in FIG. 3.) A corresponding, mating contact fitting 22, e.g., a trailer ball hitch or the like, is secured to the axle A by means of a plate 24 which is secured to the axle A by suitable means (e.g., welding, U-bolts, etc.).

The above described strut 10 and mounting means will be seen to require some means to maintain the alignment of the lower end 18 of the strut 10 and its contact means 20, with the corresponding axle contact means 22. Accordingly, the strut 10 is surrounded by a telescoping sleeve 26, having an upper or first portion 28 and a lower or second portion 30. The upper portion 28 is preferably slightly larger in diameter than the lower portion 30, to serve as a dust and dirt shield for the strut 10 enclosed therein. The upper portion 28 has an upper end 32 which is secured about the upper end 12 of the strut 10 by means of a plate 34 or other attachment means surrounding the upper end 12 of the strut 10. A flexible upper boot 36, similar to a constant velocity joint cover or boot known in the automotive field, is secured to the upper end attachment means 34 and to the upper end 32 of the upper portion 28 of the sleeve 26 by first and second upper hose clamps 38 or the like. Other, alternative means of securing the upper portion 28 of the sleeve 26 to the strut 10 may be provided as desired.

The opposite lower end 40 of the lower portion 30 of the strut guide sleeve 26 is secured to the axle contact 22 extending from the axle A. Similar means may be used to secure the lower end 40 to the axle contact 22 as the means used to secure the upper portion 28 of the sleeve 26 to the strut upper end 12, e.g., a lower plate 42 secured to the axle contact 22, with a flexible lower boot 44 secured to the lower plate 42 and the lower end 40 of the lower sleeve portion 30 by means of first and second lower hose clamps 46. Again, alternative attachment means may be used.

While the above described sleeve enclosure 26 for the strut 10 serves to protect the strut 10 from dirt, moisture, and foreign matter, its primary purpose is to maintain the alignment of the lower end 18 of the strut 10 with the corresponding contact fitting 22 of the axle A, as noted further above. Accordingly, it will be seen that the diameter of the enclosure 26 relative to the diameter of the strut 10 and its mating strut contact 20 and axle contact 22, is somewhat exaggerated for clarity in the drawing FIG. 3. An actual strut enclosure 26 would have an inside diameter only slightly larger than the largest diameter of the strut 10 and its lower contact components 20 and 22, in order to guide and align the lower end 18 of the strut 10 precisely with the axle contact 22.

Figure 4:
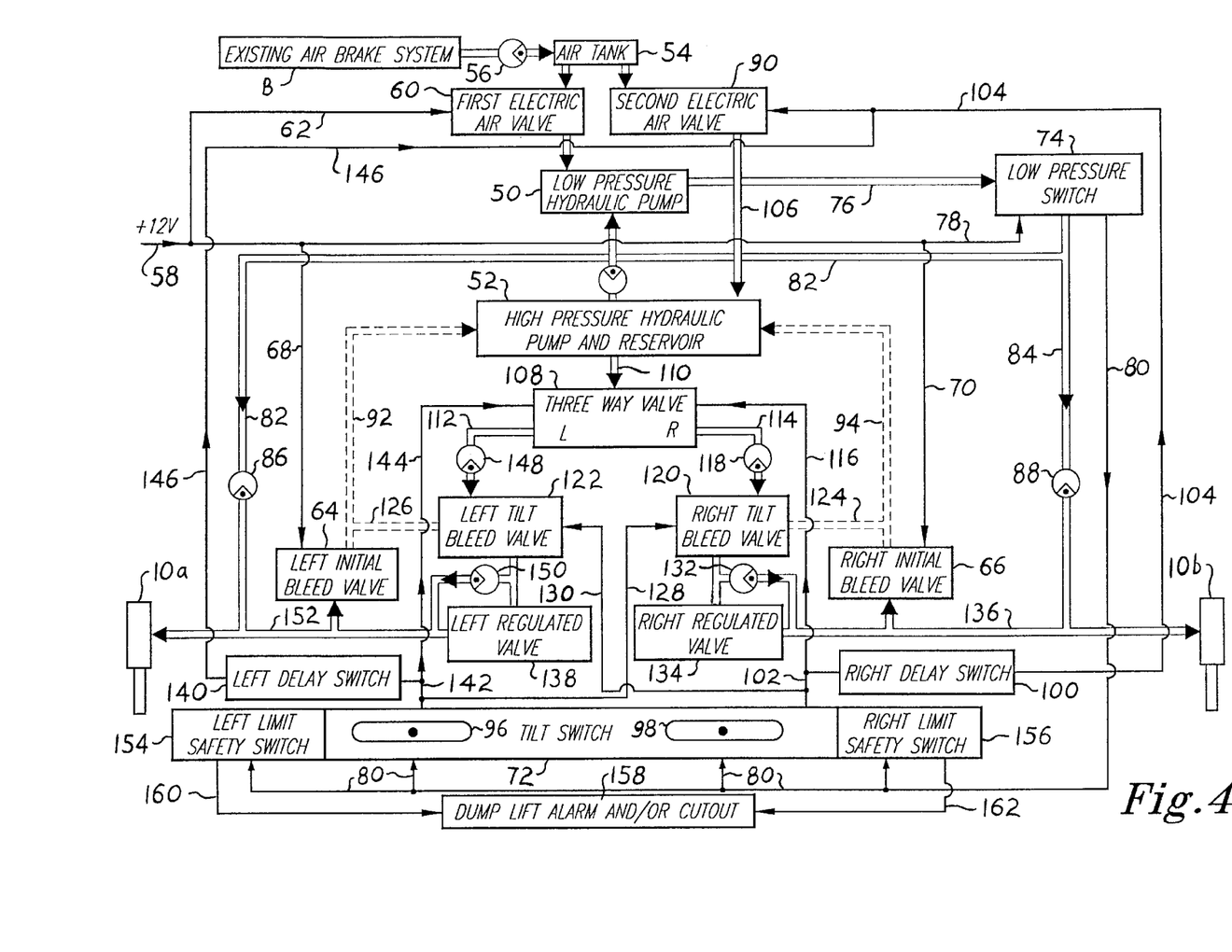
FIG. 4 is a schematic view of the present electrohydraulic and pneumatic leveling system of the present invention, showing the various components thereof and their mutual relationships.

FIG. 4 provides a schematic diagram of the present automatic leveling system. The present leveling system incorporates both a low pressure hydraulic pump 50 and a high pressure hydraulic pump 52, for reasons made clear further below. These two pumps 50 and 52 may be powered by any suitable means, e.g., electric motor or auxiliary engine of the vehicle V, etc. However, since such dump vehicles V conventionally include air brake systems wherein the normally activated vehicle brakes are released by means of pressurized air acting against springs in the system, the pumps 50 and 52 may make use of pressurized air from the existing air brake system, indicated generally as B in FIG. 4, to supply an air tank 54. One or more check valves 56 are preferably included in the system, to ensure that air pressure is supplied to the vehicle brakes before serving to power the two hydraulic pumps 50 and 52.

The present leveling system also requires electrical power for operation, preferably from the conventional twelve volt electrical system 58 of the vehicle V for signalling the vehicle hydraulic system for actuation of the lift strut L for the dump box D. It will be seen that other voltages or electrical values may be used, depending upon the voltage of the electrical supply, with electrical components (solenoids, relays, etc.) being provided accordingly with the appropriate electrical power ratings.

When the electrical system 58 for the dump box hydraulic lift strut L is activated, electrical energy is also provided to the present leveling system and travels to a first electrically powered air valve 60 via an electrical line 62. This electric signal causes the valve 60 to open, thereby supplying high pressure air from the air tank 54 to the first or low pressure hydraulic pump 50, to drive the pump 50. Electrical power from the electrical source 58 is also provided to a first or left and a second or right electrically actuated, normally open hydraulic bleed valve, respectively 64 and 66 by respective electrical lines 68 and 70, causing those valves 64 and 66 to close, thereby locking any hydraulic fluid and pressure within the respective first or left and second or right hydraulic leveling struts 10a and 10b. Finally, the initial activation of the electrical power source 58 also provides electrical power to an electrical tilt switch 72 via a low pressure hydraulically actuated switch 74 and electrical input and output lines 76 and 78, with the tilt switch 72 providing tilt signals for the system as described further below.

When the hydraulic low pressure switch 74 receives sufficient pressure from the low pressure hydraulic pump 50 via the hydraulic line 76, the electrical switch therein is closed to provide electrical power to the tilt switch 72 via wiring 78 and 80. Simultaneously, the low pressure pump 50 is supplying hydraulic fluid at relatively low pressure (i.e., approximately 100 psi maximum) to the first and second leveling strut means 10a and 10b via respective low pressure hydraulic lines 82 and 84, causing them to overcome their normally retractive spring force and extend to provide a complete link between the upper or frame attachment point 16 and the lower or axle contact point 22, shown in FIG. 3.

Left and right low pressure return check valves, respectively 86 and 88, are provided in the low pressure lines 82 and 84 to preclude high pressure flow back through the low pressure lines 82 and 84 to the low pressure switch 74 when the high pressure portion of the system is engaged, as discussed further below. Again, the low pressure fluid cannot return from the struts 10a and 10b, due to the closure of the initial bleed valves 64 and 66 when electrical power was actuated. This provides an initial starting point for the hydraulic struts 10a and 10b, although the relatively low pressure is insufficient to provide any significant leveling force for the vehicle V. Thus, if the vehicle V is initially tilted somewhat when the system is activated, the tilt angle will remain, with the two opposite struts 10a and 10b being extended to different lengths according to the distances between their respective frame attachment points 16 and axle contact points 22.

While the above described initial or low pressure extension of the struts 10a and 10b provides a significant steadying effect for a tilted dump box D, due to the hydrostatic lock effect provided, the relatively low pressure cannot significantly overcome any initial tilt of the dump box D, as noted above. Accordingly, a high pressure hydraulic subsystem is provided to provide sufficient hydraulic pressure to the struts 10a and 10b to level a tilted and loaded dump box D when it is raised.

Once the low pressure extension of the struts 10a and 10b and tilt switch 72 activation has been accomplished, the tilt switch 72 provides electrical commands to a second electric air valve 90 which provides pneumatic air power for driving the high pressure pump 52 for extending the struts 10a or 10b, as appropriate. It will be seen that if the vehicle V is laterally level, then no electric signals will be sent from the tilt switch 72, and the second air valve 90 will remain closed, with the entire system being shut down and the hydraulic cylinders 10a and 10b retracted when power is terminated as the dump box D is lowered to its rest position; hydraulic fluid returns to the hydraulic fluid reservoir 52 (which may be incorporated with the high pressure pump) from the two struts 10a and 10b through the now open bleed valves 64 and 66 via respective return lines 92 and 94, shown in broken lines. However, in the event that the dump box D is tilted laterally, the tilt switch 72 will send an electric signal from its low side to the second electric air valve 90, through a left or right delay switch and connecting wiring, as described further below.

The tilt switch 72 may comprise first or left and opposite second or right mercury switches, respectively 96 and 98, each receiving electrical power via the line 80 from the low pressure switch 74 once the minimum hydraulic pressure has been reached to close that switch 74, as described further above. (Alternatively, a single mercury switch having a center input and opposite left and right outputs, or other level sensing means, may be provided.)

As an example of the strut extension operation, assume the vehicle V is laterally tilted to the right as shown in FIG. 2. This will result in the closure of the second or right mercury switch 98, as the liquid mercury droplet therein flows to the right hand end of the capsule 98. This closes the circuit from the input line 80 to the right hand delay switch 100 via the electrical line 102, with the delay switch 100 closing after a predetermined period of time (e.g., one to five seconds; other delay times may be set as desired) to send an electric signal to the second or high pressure pump electric air valve 90 via the electric line 104.

The reason for the delay is to allow for further settling of the rear wheels W of the vehicle V as the dump box D is tilted back toward the vertical, thus shifting the weight of the structure and contents away from the low wheel(s) W. Oftentimes, when weight is shifted from the low to the high side as the dump box is positioned vertically, the greater weight on the uphill wheels will cause the vehicle V to settle toward that side, thus offsetting some of the adjustment required by extending the low strut(s). The delay allows for such settling and results in fewer adjustments by the system.

When the right delay switch 100 has closed after a predetermined delay, the electric signal continues to the second or high pressure hydraulic pump actuating air valve 90, assuming that the high side of the vehicle V has not settled to return the dump box D to level and open the right hand mercury switch 98, in which case no signal would be received by the air valve 90. Assuming that the right side of the vehicle V is still low after one or more seconds of delay, thus causing the right hand mercury switch 98 to remain closed, an electric signal continues through the closed mercury switch 98 and through the now closed delay switch 100 to the air valve 90, via the electric line 104. (It will be seen that this signal may continue to the opposite delay switch, but this signal cannot cause closure of the opposite switch from that side of the switch, hence no activation of the opposite leveling strut 10a may occur, regardless of the time delay involved.)

The signal from the right delay switch 100 causes the air valve 90 to open, thus driving the high pressure pump 52 by means of the pneumatic or air line 106. The high pressure pump 52 delivers hydraulic fluid under high pressure (e.g., ten thousand psi, more or less) to a three way valve 108 having a single input 110 from the high pressure pump 52 and left and right outputs, respectively 112 and 114. The three way valve 108 is controlled by electric signals from the from the tilt switch 72, with the right output 114 being opened from a signal from the closed right side mercury switch 98 via the electrical line 116. The opposite left side output 112 remains closed, as it is not activated.

At this point, high pressure hydraulic fluid flows from the right output 114, through a one way check valve 118 functioning to preclude reverse flow back to the three way valve 108 when the system is deactivated, to the right hand tilt bleed valve 120. The two tilt bleed valves 120 and 122 of the present system are always open to allow flow of hydraulic fluid from the respective left and right outputs 112 and 114 of the three way valve 108, but each of the tilt bleed valves 120 and 122 includes a normally closed bypass or bleed, respectively 124 and 126, which connects with the respective left and right bleed return lines 92 and 94. The two tilt bleed valves 120 and 122 are activated to allow flow through their respective return lines 124 and 126 by respective first and second crossover electrical lines 128 and 130, extending respectively from the left mercury switch 96 to the right tilt bleed valve 120 and from the right mercury switch 98 to the left tilt bleed valve 122.

Accordingly, in the presently described case where the right side of the dump box D is lower than the left side, the right mercury switch 98 will close, as described further above. Thus, an electrical signal will travel to the right hand delay switch 100, as noted further above, and will also immediately travel to the left hand tilt bleed or unloading valve 122, with no delay. This opens the left return 126 of the left tilt bleed valve 122, allowing fluid to flow back through the left tilt bleed or unloading valve 122 from the left leveling strut 10a, as regulated by further valving described further below.

From the right tilt bleed or unloading valve 120, high pressure hydraulic fluid flows through a right bypass and check valve 132 around the right hand regulated valve 134, thence to a right hand fluid supply line 136 to the right side leveling strut or struts 10b, to lift the right side of the dump box D. The fluid flow bypasses the right regulated valve 134 to extend the right hand strut(s) 10b, as the right regulated valve 134 allows only restricted or regulated hydraulic fluid flow therethrough in a direction opposite that of fluid flow to the strut(s) 10b. In other words, no fluid may flow through the regulated valve 134 in a direction from the right tilt bleed valve 120 toward the right strut(s) 10b. However, high pressure fluid, i.e., fluid having a pressure greater than that supplied by the low pressure pump 50 for providing initial extension of the struts 10a and 10b, may flow back through the left and right tilt bleed or unloading valves 122 and 120, to return to the reservoir 52 via their respective hydraulic return lines 126, 92 and 124, 94. A left side regulated valve 138 provides the same function for the operation of the left side hydraulic leveling strut(s) 10a.

The reason for the left and right regulated valves 138 and 134 is to preclude the alternating lifting of both sides of the dump box D, as a relatively low first side is raised and the opposite second side settles, resulting in the first side then being higher than the second side. If no means were provided to lower the relatively high first side, the system would continue to raise each side alternatingly until reaching the limits of travel of the struts.

Accordingly, the two regulated valves 134 and 138 provide for the lowering of a side previously raised by activation of the high pressure subsystem of the present leveling system. Once the trailer dump box D is level, both of the mercury tilt switches 96 and 98 would be open, thereby shutting off any signal to open either of the air valves 60 and 90 to drive either pump 50 or 52. However, if the left side of the vehicle V settles or sinks after the right side strut(s) 10b have leveled the dump box D, resulting in the right side being higher than the left, the left side mercury switch 96 would close, sending a signal to the left side delay switch 140 by means of the left side delay switch electrical line 142.

As noted above, this has two disadvantages for leveling the dump box D: First, the built in delay may not provide for a sufficiently rapid response, when settling occurs after one side has been raised, particularly when greater weight is being placed upon the rear of the vehicle V as the dump box D is raised. Second, the alternating raising of one side and then the other, would eventually reach the limits of the system, if no means is provided to allow the lowering of a high side during the leveling operation. Accordingly, when one side (e.g., the right side) has been raised, and the opposite side (e.g., the left side) settles to a position lower than the right side, the closure of the left side mercury switch 96 also sends a signal to the right side tilt bleed or unloading valve 120, via the first crossover electrical line 128.

This opens the normally closed bypass of the right tilt bleed valve 120, allowing fluid to flow back toward the reservoir 52, with its high pressure hydraulic pump. (These two components may be separated if so desired, but are shown as a single unit to conserve space in the present drawing FIG. 4.) However, it will be seen that the normally open right initial bleed valve 66 remains closed, as it is receiving an electric signal from electrical line 70. Thus, high pressure fluid may only return from the right side leveling strut(s) 10b through the right regulated valve 134, back to the right tilt bleed valve 120 to its return line 124 which has been opened by the signal from the closed left tilt switch 96.

The regulated valves 134 and 138 completely block flow in a direction from their respective lift struts 10b and 10a, as noted above. However, pressure above a predetermined amount (preferably about 120 psi, in order to maintain extension of the struts 10) is able to flow back through the regulated valves 134 and 138 to their respective tilt bleed or unloading valves 120 and 122, and thence to the reservoir 52 via their respective return lines. In the present example where the left side has settled after the right side has been raised, high pressure hydraulic fluid (above the approximately 120 psi minimum pressure setting of the regulated valves) flows from the right strut(s) 10b through the right regulated valve 134 to the right tilt bleed valve 120, (now opened via a signal from the now closed left mercury switch 96 of the tilt switch 72), and back through the return lines 124 and 94 through the open right tilt bleed valve 120, to the reservoir 52.

The above description of the function of the present leveling system describes completely the leveling of the dump box D of the vehicle V when the right side of the vehicle V is initially low, and when the opposite left side settles to a position lower than the raised right side. It will be seen that the system functions in a like manner when the left side is the initially low side, with closure of the left mercury switch 96 immediately activating the left output 112 of the three way valve 108 via the electrical line 144 and sending a signal to the left delay switch 140 via the electrical line 142. After the predetermined delay, the left delay switch 140 sends a signal to the second electric air valve 90 via the electric line 146 from the left delay switch 140 to the air valve 90, causing the air valve 90 to activate the high pressure hydraulic pump 52.

High pressure hydraulic fluid flows from the pump 52 to the three way valve 108, thence from the left output 112 of the valve 108 and through the left check valve 148, to the left tilt bleed valve 122. The bypass or bleed line 126 from the valve 122 is closed at this point, as it is not receiving an electrical signal from the open right side mercury switch 98 of the tilt switch 72. Thus, all fluid flows from the left tilt bleed valve 122 through the bypass and check valve 150 for the left regulated valve 138, and thence to the left side leveling strut(s) 10a via the left strut supply line 152.

In the event that the left side of the dump box D is raised too high, due to settling of the opposite right side or for other reasons, the release of high pressure hydraulic fluid (if any) in the opposite right side strut(s) 10b functions the same as described above for releasing high pressure from the left strut(s) 10a. If the right side of the dump box D is relatively lower than the left side after the left side has been raised, then the right side mercury switch 98 closes to send an immediate signal to the left tilt bleed valve 122 via the second crossover electrical line 130, to open the bleed and allow pressure to escape via the fluid return lines 126 and 92 to the pump/reservoir 52. Any pressure above the preset minimum, passes from the left lift strut(s) 10a through the left strut supply line 152, to the left regulated valve 138. The left regulated valve 138 then allows the fluid pressure to be relieved back to the left tilt bleed valve 122, which is opened to the return line 126 due to receipt of a signal from the second crossover electrical line 130, as noted above.

The present leveling system may incorporate further features, such as an audible or visual alarm if a predetermined lateral slope or tilt limit is reached or exceeded, and/or a cutout or pressure release for the dump box lift strut L. Additional left and right limit safety switches 154 and 156 may be incorporated integrally with or separately from the main tilt switch 72, if so desired. These switches may receive electrical power from the electrical output line 80 from the low pressure switch 74 to the primary tilt switch 72, or may be powered by another power source.

These switches 154 and 156 may be mercury type switches or other switches suitable for detecting and signalling a tilt condition which has reached or exceeded a predetermined limit. The switches 154 and 156 each send a signal to the dump lift alarm and/or cutout means 158, respectively by left and right electrical safety switch lines 160 and 162. The alarm means may be incorporated within the cab of the tractor R of the vehicle V, and may comprise any known audible (horn, bell, buzzer, etc.), visual (steady or flashing light, etc.), or perhaps even tactile alarm means to alert the operator of the vehicle V that the tilt of the dump box D has reached or exceeded a predetermined safe limit. The above described alarm means is to be independent of the leveling system described above, in order that it will function in the event that either of the two strut means 10a or 10b reaches its maximum travel, to alert the operator that the dumping operation must be discontinued and the dump box D lowered.

The present leveling system may further include lift strut cutout means, either separately or in combination with the alarm means discussed above, and actuated by the same limit safety switches 154 and 156 described further above. The lift strut cutout means may comprise electrical communication from the safety switches 154 and 156, to a conventional solenoid controlling a pressure release valve for the lift strut L, or to the solenoid controlling hydraulic operation of the lift strut L, or by other suitable means known in the art.

In summary, the present automated leveling system for dump vehicles will be seen to provide a much needed advance in safety for such vehicles, particularly those dump vehicles comprising a separate semi trailer with a relatively long dump box. The present leveling system enables a dump vehicle operator to position the vehicle as desired for dumping, and to raise the dump box of the dump vehicle to initiate dumping operations, on any lateral slope not exceeding the predetermined limits of the device as set by any safety switches incorporated therewith. The present system provides for leveling the dump box simultaneously with the raising or tilting of the dump box by the dump box lifting mechanism of the vehicle, without requiring the dump box lifting operation to be stopped for leveling, and without requiring the dump box to be lowered and the vehicle to be repositioned.

The present system provides great flexibility, as it is not limited to only raising or lifting alternate sides of the dump box. Rather, the present system can accommodate settling of the opposite side of the vehicle after an initial adjustment, by immediately lowering the side of the dump box which was previously raised. This raising (through a delay switch, to allow time for the opposite side to settle and lower the previously raised side, assuming such has occurred, or alternatively by means of an immediate acting differential pressure system) and lowering action may occur any number of times as required to position the dump box in a level position according to the tolerances set for the level switches of the system.

The novel low pressure and high pressure subsystems of the present system enable the normally retracted lifting jacks or struts to be extended for initial contact with their respective contact points by using relatively low pressure, yet provide sufficient high pressure for leveling a loaded dump box with most of its weight disposed over the rear axle(s) and the associated lifting struts. The novel strut alignment means of the present system also serve to protect the hydraulic lifting struts of the system, as well as serving to hold the free, normally retracted ends of the struts in alignment with their respective contact points in the vehicle structure.

Thus, it will be seen that the present system provides a totally automated means of leveling a dump vehicle without requiring the vehicle operator to cease dumping operations at any time, or to reposition the vehicle, so long as the lateral slope upon which the vehicle is parked does not exceed the predetermined limits of the system. The present leveling system thus saves considerable turnaround time, and therefore expense, for an operator who is operating a dump vehicle equipped with the present system. The present leveling system will thus essentially pay for itself in short order, particularly in the case of larger semi trailer type dump vehicles having greater operating expenses, as well as greatly increasing safety for such vehicles.

It is to be understood that the present invention is not limited to the sole embodiment described above, but encompasses any and all embodiments within the scope of the following claims.

I claim:

1. An automatic leveler for a vehicle having a tilting dump box, comprising:

oppositely disposed first and second hydraulic leveling strut means, for laterally leveling the dump box for dumping operations when the vehicle is parked on laterally sloping terrain;

a low pressure hydraulic pump communicating hydraulically with said first and second leveling strut means, for initially extending and taking up slack in each said leveling strut means;

a high pressure hydraulic pump communicating hydraulically with said first and second leveling strut means, for providing leveling extension of each said leveling strut means;

valve means hydraulically communicating with said high pressure pump and each said leveling strut means, for selectively extending each said leveling strut means; and tilt switch means communicating with said valve means, for signaling said valve means for selectively extending and retracting either of said leveling strut means according to any predetermined lateral tilt detected by said tilt switch means.

2. The automatic leveler according to claim 1, with the vehicle including an air brake system, wherein said low pressure hydraulic pump and said high pressure hydraulic pump are each powered pneumatically by pressurized air from the vehicle air brake system.

3. The automatic leveler according to claim 1, including delay switch means communicating with said high pressure hydraulic pump, for delaying activation of said high pressure hydraulic pump for extending either of said leveling strut means.

4. The automatic leveler according to claim 1, with the vehicle including hydraulic lift strut means for selectively tilting the dump box of the vehicle, including cutout means for temporarily and selectively disengaging the hydraulic lift strut means of the vehicle when any of said leveling strut means reaches a predetermined limit.

5. The automatic leveler according to claim 1, including alarm means for signaling the operator of the vehicle when any of said leveling strut means reaches a predetermined limit.

6. The automatic leveler according to claim 1, wherein:

said first and second leveling strut means each comprises at least one normally retracted telescoping hydraulic strut having a first end pivotally securable to a frame member of the vehicle dump box, and an opposite second end having contact means disposed thereon; and each said leveling strut means including a contact fitting securable to a corresponding axle of the vehicle for fitting with said contact means of each said leveling strut means when said leveling strut means is extended.

7. The automatic leveler according to claim 6, including a telescoping sleeve disposed about said hydraulic strut, with each said sleeve having a first portion extending from a corresponding said first end of said strut and an opposite second portion extending from a corresponding said contact fitting of the corresponding axle of the vehicle, for holding a corresponding said second end of said strut in alignment with said corresponding said contact fitting.

8. An automatic leveler for a vehicle having a tilting dump box, comprising:

oppositely disposed first and second hydraulic leveling strut means, for laterally leveling the dump box for dumping operations when the vehicle is parked on laterally sloping terrain;

hydraulic pump means communicating hydraulically with said first and second leveling strut means, for initially extending and taking up slack in each said leveling strut means and for providing leveling extension of each said leveling strut means;

valve means hydraulically communicating with said pump means and each said leveling strut means, for selectively extending each said leveling strut means;

delay switch means communicating with said pump means, for delaying activation of said pump means for extending either of said leveling strut means; and tilt switch means communicating with said valve means, for signaling said valve means for selectively extending and retracting either of said leveling strut means according to any predetermined lateral tilt detected by said tilt switch means.

9. The automatic leveler according to claim 8, with the vehicle including an air brake system, wherein said hydraulic pump means is powered pneumatically by pressurized air from the vehicle air brake system.

10. The automatic leveler according to claim 8, wherein:

said hydraulic pump means comprises a low pressure hydraulic pump and a high pressure hydraulic pump;

said low pressure hydraulic pump communicating hydraulically with said first and second leveling strut means, for initially extending and taking up slack in each said leveling strut means; and said high pressure hydraulic pump communicating hydraulically with said first and second leveling strut means, for providing leveling extension of each said leveling strut means.

11. The automatic leveler according to claim 8, with the vehicle including hydraulic lift strut means for selectively tilting the dump box of the vehicle, including cutout means for temporarily and selectively disengaging the hydraulic lift strut means of the vehicle when any of said leveling strut means reaches a predetermined limit.

12. The automatic leveler according to claim 8, including alarm means for signaling the operator of the vehicle when any of said leveling strut means reaches a predetermined limit.

13. The automatic leveler according to claim 8, wherein:

said first and second leveling strut means each comprises at least one normally retracted telescoping hydraulic strut having a first end pivotally securable to a frame member of the vehicle dump box, and an opposite second end having contact means disposed thereon; and each said leveling strut means includes a contact fitting securable to a corresponding axle of the vehicle for fitting with said contact means of each said leveling strut means when said leveling strut means is extended.

14. The automatic leveler according to claim 13, including a telescoping sleeve disposed about said hydraulic strut, with each said sleeve having a first portion extending from a corresponding said first end of said strut and an opposite second portion extending from a corresponding said contact fitting of the corresponding axle of the vehicle, for holding a corresponding said second end of said strut in alignment with said corresponding said contact fitting.

15. A dump vehicle and an automatic leveler therefor, comprising in combination:

a vehicle having a selectively tilting dump box, with said vehicle having a frame, at least one axle disposed beneath said dump box and said frame, and resilient suspension means disposed between said at least one axle and said frame;

opposite first and second hydraulic leveling strut means disposed between said vehicle frame and said at least one axle, for laterally leveling said dump box for dumping operations when said vehicle is parked on laterally sloping terrain;

a low pressure hydraulic pump communicating hydraulically with said first and second leveling strut means, for initially extending and taking up slack in each said leveling strut means;

a high pressure hydraulic pump communicating hydraulically with said first and second leveling strut means, for providing leveling extension of each said leveling strut means;

valve means hydraulically communicating with said high pressure pump and each said leveling strut means, for selectively extending each said leveling strut means;

delay switch means communicating with said pump means, for delaying activation of said pump means for extending either of said leveling strut means; and tilt switch means communicating with said valve means, for signaling said valve means for selectively extending and retracting either of said leveling strut means according to any predetermined lateral tilt detected by said tilt switch means.

16. The dump vehicle and automatic leveler combination according to claim 15, wherein said vehicle includes an air brake system, and said low pressure hydraulic pump and said high pressure hydraulic pump are each powered pneumatically by pressurized air from said vehicle air brake system.

17. The dump vehicle and automatic leveler combination according to claim 15, wherein said vehicle includes hydraulic lift strut means for selectively tilting the dump box of the vehicle, and said automatic leveler includes cutout means for temporarily and selectively disengaging said hydraulic lift strut means of said vehicle when any of said leveling strut means reaches a predetermined limit.

18. The dump vehicle and automatic leveler combination according to claim 15, including alarm means for signaling the operator of said vehicle when any of said leveling strut means reaches a predetermined limit.

19. The dump vehicle and automatic leveler combination according to claim 15, wherein:

said first and second leveling strut means each comprises at least one normally retracted telescoping hydraulic strut having a first end pivotally secured to said frame, and an opposite second end having contact means disposed thereon;

each said leveling strut means including a contact fitting secured to a corresponding said axle of said vehicle for fitting with said contact means of each said leveling strut means when said leveling strut means is extended;

each said leveling strut means further including a telescoping sleeve disposed about said hydraulic strut;

each said sleeve having a first portion extending from a corresponding said first end of said strut; and each said sleeve further having an opposite second portion extending from a corresponding said contact fitting of said corresponding said axle of said vehicle, for holding a corresponding said second end of said strut in alignment with said corresponding said contact fitting.

20. The dump vehicle and automatic leveler combination according to claim 15, wherein said vehicle is a tractor and semi trailer, with said semi trailer including said tilting dump box.

* * * * *